United States Patent Office 2,938,902
Patented May 31, 1960

---

2,938,902

NOVEL PYRIDAZINONES AND METHODS OF PREPARING SAME

Shirley Du Breuil, Stamford, Conn., assignor to American Cyanamid Company, New York, N.Y., a corporation of Maine No Drawing. Filed Apr. 24, 1959, Ser. No. 808,581

12 Claims. (Cl. 260—250)

This invention relates to (A) novel N-chloromethyl pyridazinones and their (B) novel phosphoric acid ester derivatives which conform, respectively, to the formulae:

(A)
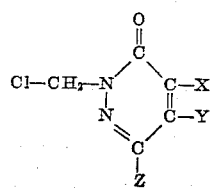

and (B)
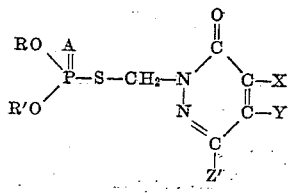

wherein X and Y represent hydrogen, halogen, phenyl or a lower alkyl radical, and when taken together X and Y represent the remainder of a benzene ring; Z represents hydrogen, hydroxy, halogen, phenyl, alkoxy, acyloxy, or a lower alkyl radical; Z' represents hydrogen, hydroxy, halogen, phenyl, a lower alkyl radical,

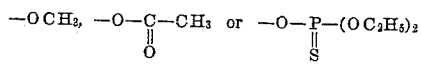

A is sulfur or oxygen; and R and R' represent lower alkyl radicals.

In general, the novel N-chloromethyl pyridazinones of the present invention may be prepared by the reaction of an N-hydroxymethyl pyridazinone with thionyl chloride. The equation below portrays the preparation of 5-bromo-4-chloro-2-chloromethyl-3(2H)-pyridazinone.

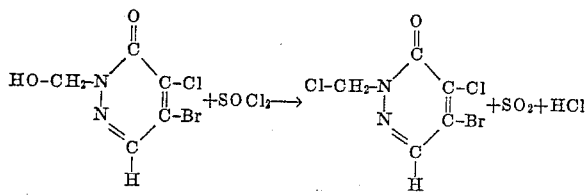

The N-hydroxymethyl pyridazinones utilized in the present process are readily prepared by the reaction of an appropriate maleic hydrazide with formaldehyde according to the method disclosed in U.S. Patent No. 2,805,926.

The N-chloromethyl pyridazinones produced as above are reacted, according to the instant discovery, with a salt of a dialkyl phosphorothioate to yield the novel phosphoric acid esters contemplated herein. The equation below, which teaches the preparation of O,O-diethyl S - (4 - bromo - 5 - chloro - 1,6 - dihydro - 6 - oxo 1 - pyridazinylmethyl) phosphorodithioate, is typical.

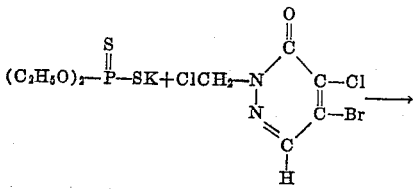

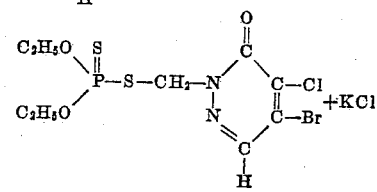

The following examples will further illustrate the invention:

EXAMPLE I 5-bromo-4-chloro-2-chloromethyl-3(2H)-pyridazinone

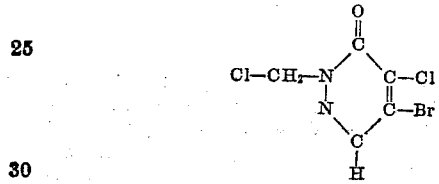

Seventy-five grams (0.3 mol) of 5-bromo-4-chloro-2-hydroxymethyl 3(2H)-pyridazinone were dissolved in 220 g. (1.8 mols) of thionyl chloride, accompanied by gas evolution. After heating at reflux (83° C.) for one hour, the excess thionyl chloride was removed under vacuum. The residue was recrystallized from an ether-hexane mixture to give an 80.6% yield of the desired product, M.P. 69–70° C.

EXAMPLE II 6-hydroxy-2-chloromethyl-3(2H)-pyridazinone

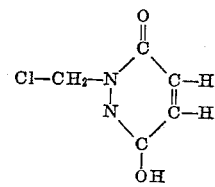

Two mols of 6-hydroxy-2-hydroxymethyl-3(2H)-pyridazinone were suspended in one liter of benzene containing 2.2 mols of thionyl chloride. The mixture was heated at reflux for 3.5 hours. The solid obtained after filtration was treated with successive portions of boiling ethyl acetate to dissolve the desired product, the latter crystallizing from these extracts, M.P. 144° C.

EXAMPLE III 2-chloromethyl-4,5-dimethyl-6-hydroxy-3(2H)-pyridazinone

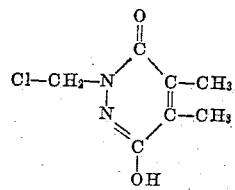

A slurry of one mol of 4,5-dimethyl-6-hydroxy-2-hydroxymethyl-3(2)-pyridazinone in six mols of thionyl chloride was heated under reflux until all the solids had dissolved and no further gases were evolved (3 hours).

After removal of the volatile materials under vacuum, the residue was crystallized from benzene. The white crystalline product melted at 115° C.

EXAMPLE IV 6-chloro-2-chloromethyl-3(2H)-pyridazinone

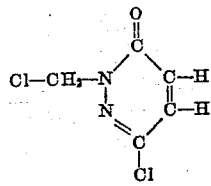

The procedure of Example I was employed using 0.3 mol of 6-chloro-2-hydroxymethyl - 3(2H) - pyridazinone and 1.8 mols of thionyl chloride. The product was recrystallized from benzene, M.P. 89–90° C., yield 94%.

EXAMPLE V 4-chloro-2-chloromethyl-1(2H)-phthalazinone

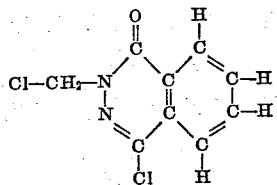

The procedure of Example I was employed using 0.3 mol of 4-chloro-2-hydroxymethyl-1(2H) - phthalazinone and 1.8 mols of thionyl chloride to give a quantitative yield of the desired product. After recrystallization from benzene, the white crystalline material melted at 145.5–146.5° C.

EXAMPLE VI 2-chloromethyl-6-methyl-3(2H)-pyridazinone

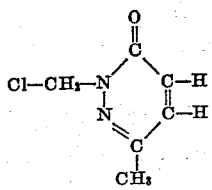

The procedure of Example I was employed using 0.5 mol of 2-hydroxymethyl-6-methyl - 3(2H) - pyridazinone and 3 mols of thionyl chloride. The product was recrystallized from benzene, M.P. 96–97° C., yield 90%.

Other typical N-chloromethyl pyridazinones of the present invention are:

6-acetoxy-2-chloromethyl-3(2H)-pyridazinone
2-chloromethyl - 6 - diethoxyphosphinothioyloxy - 3(2H)-pyridazinone
2-chloromethyl-6-ethyl-3(2H)-pyridazinone
2-chloromethyl-6-phenyl-3(2H)-pyridazinone
6-bromo-2-chloromethyl-3(2H)-pyridazinone
2-chloromethyl-6-ethoxy-3(2H)-pyridazinone
6-bromo-2 - chloromethyl - 4,5 - dimethyl - 3(2H) - pyridazinone
6-chloro-2-chloromethyl-4,5-diethyl-3(2H)-pyridazinone
2-chloromethyl-6-isopropyl-3(2H)-pyridazinone
4-bromo-2-chloromethyl-1(2H)-phthalazinone The N-chloromethyl pyridazinones contemplated herein are stable, well-characterized compounds which may be advantageously employed for a variety of commercial and agricultural purposes. As disclosed hereinabove and as further illustrated hereinafter, the N-chloromethyl pyridazinones, when reacted with alkali metal dialkyl phosphorothioates, give phosphoric acid esters. These esters possess a high degree of insecticide and acaricide activity.

The following examples illustrate the utility of the N-chloromethyl pyridazinones as intermediates in the preparation of the phosphoric acid esters:

EXAMPLE VII

O,O-diethyl S-(4-bromo-5-chloro-1,6-dihydro-6-oxo-1-pyridazinylmethyl) phosphorodithioate

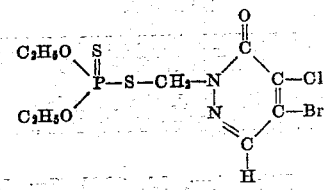

One-tenth mol quantities of potassium O,O-diethyl phosphorodithioate (22.4 g.) and 5-bromo-4-chloro-2-chloromethyl-3(2H)-pyridazinone (25.7 g.) were mixed together in 175 ml. of acetone (solvent) in the presence of 0.05 mol of sodium bicarbonate (4.2 g.). The mixture was heated at 50–55° C. for three hours and then filtered to remove the inorganic salts. The acetone was removed under vacuum, and the residue was dissolved in toluene. The toluene solution was washed with 10% aqueous sodium carbonate solution to remove acidic by-products, and then dried. After removal of the toluene, the product was an orange-colored syrupy liquid having a refractive index $n_D^{25}$ 1.5980. Analysis calculated for

$C_9H_{13}BrClN_2O_3PS_2$

N, 6.87; P, 7.60. Found: N, 7.19; P, 7.61.

EXAMPLE VIII

O,O-diethyl S-(1,6-dihydro-3-hydroxy-6-oxo-1-pyridazinylmethyl) phosphorodithioate

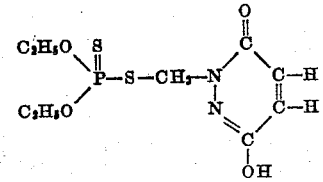

The procedure of Example VII was employed using potassium O,O-diethyl phosphorodithioate, 6-hydroxy-2-chloromethyl-3(2H)-pyridazinone and isopropanol (solvent). The final toluene solution was not washed, since the product separated as a solid. After recrystallization from benzene, the compound melted at 104–104.5° C. Analysis: Theory N, 9.03; P, 9.98. Found N, 8.79; P, 10.12.

EXAMPLE IX

O,O-diethyl S-(1,6-dihydro-4,5-dimethyl-3-hydroxy-6-oxo-1-pyridazinylmethyl) phosphorodithioate

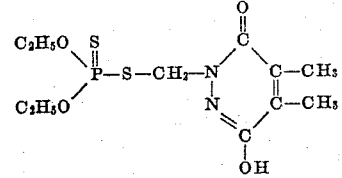

The procedure of Example VII was employed using one-tenth mol quantities of potassium O,O-diethyl phosphorodithioate and 2 - chloromethyl -4,5- dimethyl-6-hydroxy-3(2H)-pyridazinone. The reactants were heated in acetone for 5 hours at 58° C. The reaction mixture was filtered to remove the potassium chloride, and the filtrate was evaporated to remove the acetone. The remaining solid product, after recrystallization from a mixture of benzene and heptane, melted at 105.5–106.5° C. Analysis: Theory N, 8.26; P, 9.13. Found N, 8.35; P, 8.96.

EXAMPLE X

O,O-dimethyl S-(3-chloro-1,6-dihydro-6-oxo-1-pyridazinylmethyl) phosphorodithioate

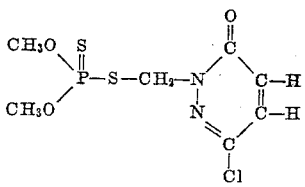

The procedure of Example VII was employed using potassium O,O-dimethyl phosphorodithioate and 6-chloro-2-chloromethyl-3-(2H)-pyridazinone. The product was an orange-colored syrupy liquid having a refractive index $n_D^{25}$ 1.5870. Analysis: Theory N, 9.32; P, 10.30. Found N, 9.17; P, 10.42.

EXAMPLE XI

O,O-diethyl S-(1,6-dihydro-3-methyl-6-oxo-1-pyridazinylmethyl) phosphorodithioate

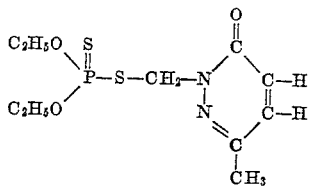

The procedure of Example VII was employed using potassium O,O-diethyl phosphorodithioate and 2-chloromethyl-6-methyl-3(2H)-pyridazinone. The reaction was conducted at room temperature for a period of 18 hours. The product was an orange-colored liquid having a refractive index $n_D^{25}$ 1.5535. Analysis: Theory N, 9.09; P, 10.04. Found N, 8.19; P, 10.32.

EXAMPLE XII

O,O-diethyl S-(4-chloro-1,2-dihydro-1-oxo-2-phthalazinylmethyl) phosphorodithioate

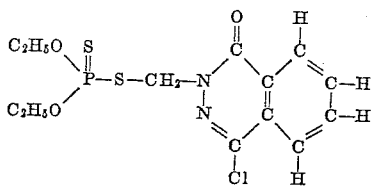

This compound was prepared according to the procedure of Example IX to give a quantitative yield. After recrystallization from hexane, the solid product melted at 78.5–79° C. Analysis: Theory N, 7.40; P, 8.18. Found N, 7.40; P, 8.26.

EXAMPLE XIII

O,O-diethyl S-(3-chloro-1,6-dihydro-6-oxo-1-pyridazinylmethyl) phosphorodithioate

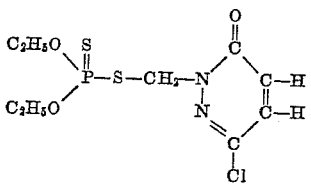

Ammonium O,O-diethyl phosphorodithioate (10.2 g.), 6-chloro-2-chloromethyl-3(2H)-pyridazinone (8.95 g.) and sodium bicarbonate (4.2 g.) were mixed together in 50 ml. of methyl isobutyl ketone and heated at 60° C. for two hours. The inorganic salt was filtered off, and the filtrate was washed with aqueous sodium carbonate solution. Evaporation of the ketone solvent gave the solid product, which after recrystallization from isopropanol melted at 52.5–53.5° C. Analysis: Theory N, 8.52; P, 9.42. Found N, 8.37; P, 9.38.

EXAMPLE XIV

O,O-diethyl S(3-chloro-1,6-dihydro-6-oxo-1-pyridazinylmethyl) phosphorodithioate

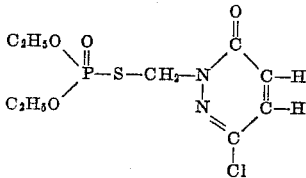

The procedure of Example XIII was employed using potassium O,O-diethyl phosphorodithioate in place of the ammonium O,O-diethyl phosphorodithioate. The product, an orange-colored oily liquid having a refractive index $n_D^{25}$ 1.5363, distilled at one micron with a jacket temperature of 115–120° C. Analysis: Theory N, 8.96; P, 9.91. Found N, 9.05; P, 10.08.

EXAMPLE XV

O,O-diethyl S-(3-acetoxy-1,6-dihydro-6-oxo-1-pyridazinylmethyl) phosphorodithioate

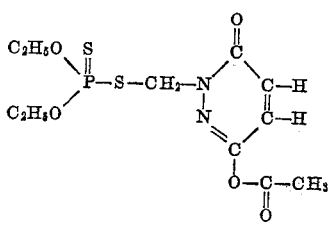

A mixture of 15.5 g. of O,O-diethyl S-(1,6-dihydro-3-hydroxy-6-oxo-1-pyridazinylmethyl) phosphorodithioate (product of Example VIII) and 25 ml. of acetic anhydride was heated at 90–95° C. for 4 hours, and then poured over crushed ice. The resulting oil was dissolved in ether and the ether solution was washed with aqueous sodium carbonate solution to remove acidic by-products. Evaporation of the ether gave an orange-colored oily liquid which was purified chromatographically on silica gel by elution with a benzene-ether mixture. The product was an orange-colored oil having a refractive index $n_D^{25}$ 1.5525. Analysis: Theory N, 7.95; P, 8.79. Found N, 8.19; P, 8.87.

EXAMPLE XVI

O,O-diethyl S-(3-diethoxyphosphinothioyloxy-1,6-dihydro-6-oxo-1-pyridazinylmethyl) phosphorodithioate

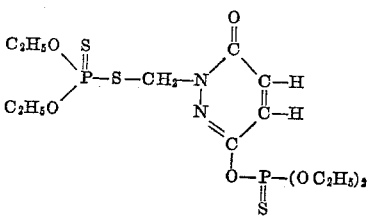

Equimolar quantities of O,O-diethyl S-(1,6-dihydro-3-hydroxy-6-oxo-1-pyridazinylmethyl) phosphorodithioate, O,O-diethyl phosphorochloridothioate and sodium carbonate were mixed together in 150 ml. of methyl isobutyl ketone and heated at 60° C. for six hours. The inorganic salts were removed by filtration, and the filtrate was washed with aqueous sodium carbonate solution to remove acidic by-products. Evaporation of the ketone solvent gave a yellow-colored oil which was purified according to the procedure of Example XV. The purified product had a refractive index $n_D^{25}$ 1.5447. Analysis: Theory N, 6.07; P, 13.42. Found N, 6.13; P, 13.45.

EXAMPLE XVII

O,O-diethyl S(1,6-dihydro-3-methoxy-6-oxo-1-pyridazinylmethyl) phosphorodithioate

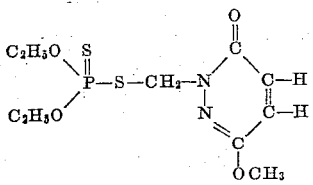

15.5 g. (0.05 mole) of the product of Example VIII was dissolved in 50 ml. of methanol containing an equivalent of sodium (1.1 g.). Methyl iodide (7.8 g., 0.55 mol) was added, and the solution was heated under reflux for three hours. The inorganic salts were filtered off, and the filtrate was washed with aqueous sodium carbonate solution to remove acidic by-products. Evaporation of the solvent gave a yellow oily liquid having a refractive index $n_D^{25}$ 1.5170.

Other typical phosphoric acid esters of the present invention are:

O,O - diethyl S - (1,6 - dihydro - 3 - ethyl - 6 - oxo - 1-pyridazinylmethyl) phosphorodithioate O,O - diethyl S - (1,6 - dihydro - 3 - phenyl - 6 - oxo - 1-pyridazinylmethyl) phosphorodithioate O,O - diethyl S - (3 - bromo - 1,6 - dihydro - 6 - oxo - 1-pyridazinylmethyl) phosphorodithioate O,O - diethyl S - (1,6 - dihydro - 3 - ethoxy - 6 - oxo - 1-pyridazinylmethyl phosphorodithioate O,O - dimethyl S - (1,6 - dihydro - 3 - dimethoxyphosphinothioyloxy - 6 - oxo - 1 - pyridazinylmethyl) phosphorodithioate O,O - dimethyl S - (3 - bromo - 1,6 - dihydro - 4,5 - dimethyl - 6 - oxo - 1 - pyridazinylmethyl) phosphorodithioate O,O - diisopropyl S - (3 - chloro - 1,6 - dihydro - 6 - oxo-1-pyridazinylmethyl) phosphorodithioate O,O - diisopropyl S - (1,6 - dihydro - 3 - methyl - 6 - oxo-1-pyridazinylmethyl) phosphorodithioate O,O - dibutyl S - (3 - chloro - 4,5 - diethyl - 1,6 - dihydro-6-oxo-1-pyridazinylmethyl) phosphorodithioate O,O - diethyl S - (4 - bromo - 1,2 - dihydro - 1 - oxo - 2-phthalazinylmethyl) phosphorothioate O,O - diethyl S - (1,6 - dihydro - 3 - methyl - 6 - oxo - 1-pyridazinylmethyl) phosphorothioate O,O - dimethyl S - (1,6 - dihydro - 3 - methoxy - 6 - oxo-1-pyridazinylmethyl) phosphorothioate O,O-dimethyl S - (3 - chloro - 1,6 - dihydro - 6 - oxo - 1-pyridazinylmethyl) phosphorothioate O,O - diisopropyl S - (3 - bromo - 1,6 - dihydro - 6 - oxo-1-pyridazinylmethyl phosphorothioate The phosphoric acid esters contemplated herein are highly active insecticides, acaricides and nematocides, either by contact or by systemic action. They may be used as sprays in organic solvents, as emulsions in water or other non-solvents, or on solid carriers such as talcs, clays, diatomaceous earths and the like.

The marked activity of the phosphoric acid esters in controlling various insects is illustrated as follows:

*Nasturtium aphid.*—100% kill with esters of Examples X, XI, XII, XIII and XIV above at a concentration of 0.01% in a solvent carrier consisting of 65% acetone and 35% water.

*German cockroach.*—85 to 100% kill with esters of Examples X, XI, XII, XIII, XIV and XVI above at a concentration of 1.0% on solid carriers such as fuller's earth and Attapulgus clay.

*Confused flour beetle.*—100% kill with esters of Examples X, XI, XIII and XIV above at a concentration of 1.0% on solid carriers such as talc and pyrophyllite.

*Milkweed bug.*—100% kill with esters of Examples X, XI, XIII, XIV and XVI above at a concentration of 1.0% on solid carriers such as pyrophyllite and Attapulgus clay.

*Southern armyworm.*—100% kill with esters of Examples X, XI, XII, XIII, XIV and XVI above at a concentration of 0.1% in a solvent carrier consisting of 65% acetone and 35% water.

The systemic activity of the phoshoric acid esters is illustrated as follows:

Young Sieva lima bean plants infested with two-spotted spider mites, *Tetranychus telarius*, are cut at ground level and inserted into an aqueous emulsion of the test compound. The test is set up with ventilation in a manner to prevent toxic action by other than translocation, and counts are made after three days. The esters of Examples XI, XIII and XIV above gave 100% kill of the mites at a concentration of 10 p.p.m.

The nematocidal activity of the phosphoric acid esters is illustrated as follows:

In an in vitro test, vinegar eelworm nematodes, *Anguilla sp.*, are kept in intimate contact with an aqueous solution of the test compound for twenty hours. The esters of Examples X, XI, XIII and XIV above gave 100% kill of the nematodes at 0.1% concentration.

The present invention is a continuation of U.S. applications Serial Nos. 745,298 and 745,299, filed June 30, 1958, both now abandoned.

While the invention has been described with particular reference to specific embodiments, it is to be understood that it is not to be limited thereto, but is to be construed broadly and restricted solely by the scope of the appended claims.

I claim:

1. A phosphoric acid ester of the general formula

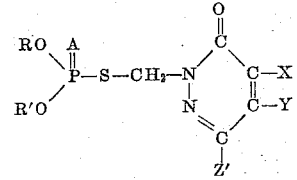

wherein R and R' represent a member of the group consisting of lower alkyl radicals, A represents a member of the group consisting of sulfur and oxygen, Z' represents a member of the group consisting of hydrogen, hydroxy, halogen, phenyl, —OCH₃,

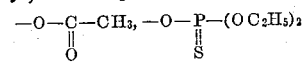

and a lower alkyl radical, X and Y represent a member of the group consisting of hydrogen, halogen, phenyl and a lower alkyl radical, and when taken together X and Y represent the remainder of an unsubstituted benzene ring.

2. O,O - diethyl S - (4 - bromo - 5 - chloro - 1,6 - dihydro-6-oxo-pyridazinylmethyl) phosphorodithioate.

3. O,O - diethyl S - (1,6 - dihydro - 4,5 - dimethyl - 3-hydroxy - 6 - oxo - 1 - pyridazinylmethyl) phosphorodithioate.

4. O,O - dimethyl S - (3 - chloro - 1,6 - dihydro - 6-oxo - 1 - pyridazinylmethyl) phosphorodithioate.

5. O,O - diethyl S - (1,6 - dihydro - 3 - methyl - 6-oxo-1-pyridazinylmethyl) phosphorodithioate.

6. O,O - diethyl S - (3 - chloro - 1,6 - dihydro - 6-oxo-1-pyridazinylmethyl) phosphorodithioate.

7. N-chloromethyl pyridazinones of the general formula

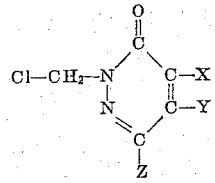

wherein Z represents a member of the group consisting of hydrogen, hydroxy, halogen, phenyl, alkoxy, and a lower alkyl radical, X and Y represent a member of the group consisting of hydrogen, halogen, phenyl and a lower alkyl radical, and when taken together X and Y represent the remainder of an unsubstituted benzene ring.

8. 5 - bromo - 4 - chloro - 2 - chloromethyl - 3(2H)-pyridazinone.

9. 6-hydroxy-2-chloromethyl-3(2H)-pyridazinone.

10. 2 - chloromethyl - 4,5 - dimethyl - 6 - hydroxy-3(2H)-pyridazinone.

11. 6-chloro-2-chloromethyl-3(2H)-pyridazinone.

12. 2-chloromethyl-6-methyl-3(2H)-pyridazinone.

No references cited.